J. M. HIXON.
HEADLIGHT FOR AUTOMOBILES.
APPLICATION FILED MAY 1, 1911.

1,019,961.

Patented Mar. 12, 1912.
2 SHEETS—SHEET 1.

Witnesses:

Inventor.
Joseph M. Hixon
By
Attorney

J. M. HIXON.
HEADLIGHT FOR AUTOMOBILES.
APPLICATION FILED MAY 1, 1911.
1,019,961.
Patented Mar. 12, 1912.
2 SHEETS—SHEET 2.
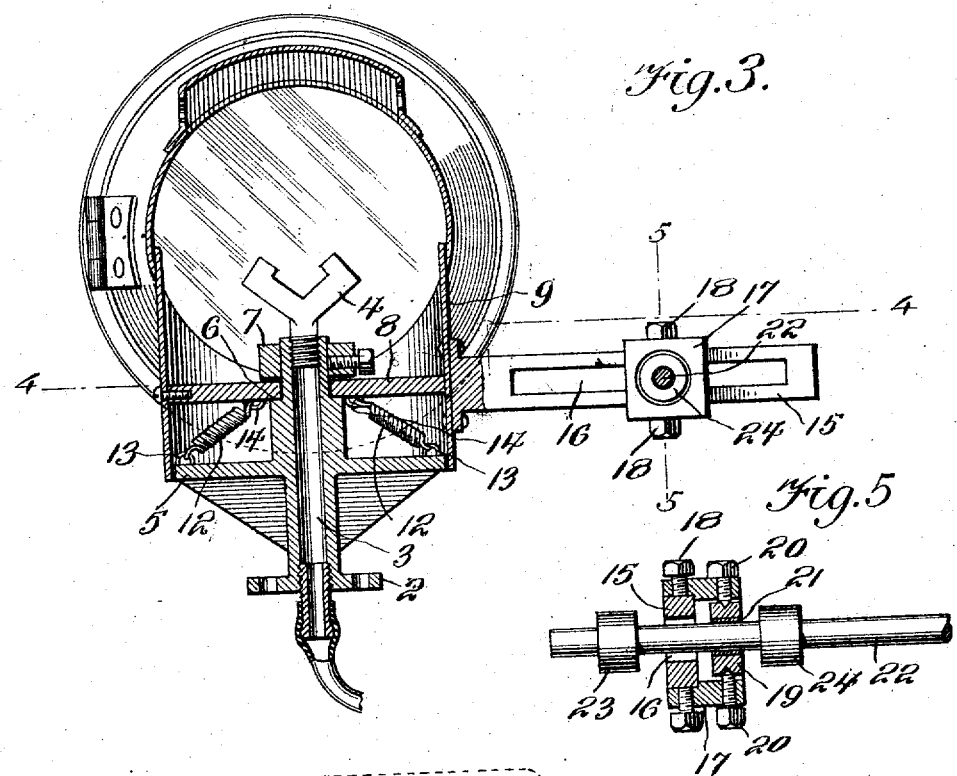
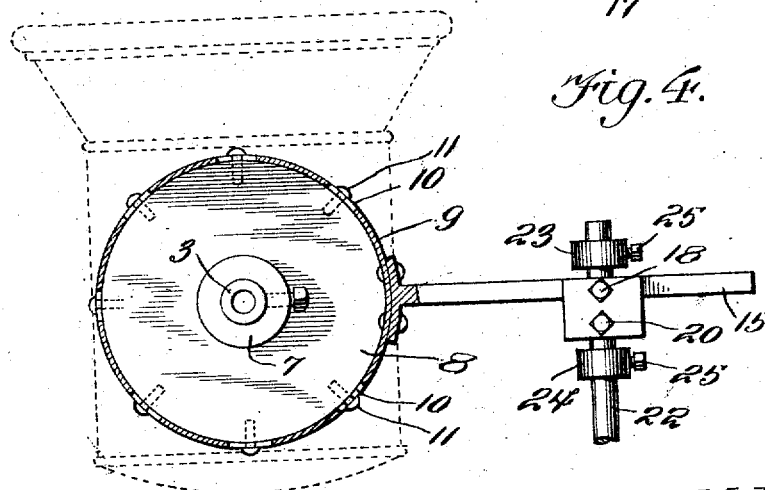
Witnesses:
Inventor.
Joseph M. Hixon
By
Attorney.

UNITED STATES PATENT OFFICE.

JOSEPH M. HIXON, OF ATTICA, INDIANA.

HEADLIGHT FOR AUTOMOBILES.

1,019,961.  Specification of Letters Patent.  Patented Mar. 12, 1912.

Application filed May 1, 1911. Serial No. 624,278.

*To all whom it may concern:*

Be it known that I, JOSEPH M. HIXON, a citizen of the United States, residing at Attica, in the county of Fountain and State of Indiana, have invented certain new and useful Improvements in Headlights for Automobiles, of which the following is a specification.

This invention relates to headlights for automobiles or like vehicles, and has for an object to provide a headlight which will automatically turn in the direction of the road at curves on corresponding movement of the vehicle steering gear.

Another object of the invention is to provide means whereby when two of such headlights are used upon the vehicle both may be made to turn simultaneously and further, the construction of said means which will permit the headlight to swing only on certain movements or adjustments of the steering gear according to the taste of the operator as may be found most serviceable according to the condition of the road-bed on which the vehicle is traveling.

Another object of the invention is to provide means for automatically returning the headlight to its normal position after the vehicle has again been directed to the plane road and which will also operate to prevent wabbling of the light when the vehicle is traveling in a straight path.

Figure 1:
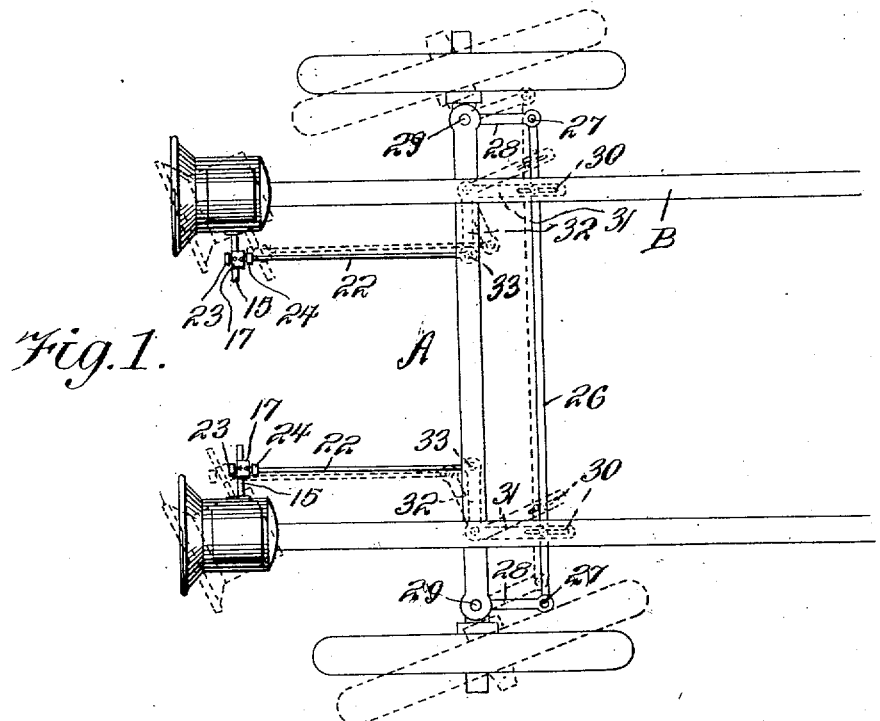
Figure 2:
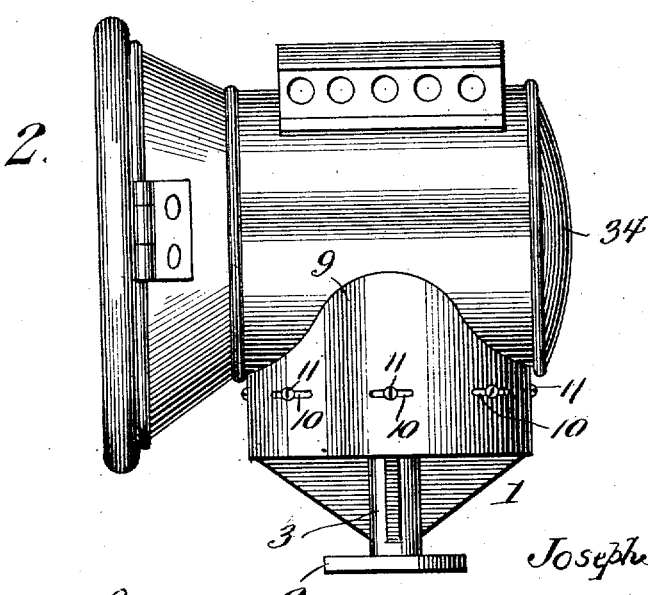

In the drawings, forming a portion of this specification and in which like numerals of reference indicate similar parts in the several views:—Figure 1 is a top plan view of a portion of an automobile frame showing my improved headlight applied thereto, and indicating in full lines the normal position of the headlight and in dotted lines the adjusted position thereof on turning operation of the steering gear. Fig. 2 is a side elevation of the headlight detached from the vehicle. Fig. 3 is a vertical section through the headlight. Fig. 4 is a section on the line 4—4 of Fig. 3. Fig. 5 is a section on the line 5—5 of Fig. 3.

While it is desirable to use the present invention on such vehicles as automobiles or the like, it will be understood that it will be found equally as desirable and effective if used upon locomotives, or like carriers. The headlight shown herein is attached to the frame of the automobile A, and as illustrated, two of said lights are preferably employed and are mounted on the side bars B at the front of the frame.

With particular reference to Figs. 2 to 4 inclusive of the drawings, the light includes a stationary base member 1 which has a bracket portion 2 to be secured in any suitable well known manner to the bar B. This base member is provided with a burner tube 3 in which is fitted a suitable tip 4, it being understood, however, that I do not limit the invention to the use of a gas burner, as the ordinary electric light may be readily substituted therefor without departing from the invention. A circular disk 5 is formed integral with the base member, and above said disk, the tube 3 of the member is provided with a horizontal shoulder 6. An adjustable retaining nut 7 on the tube operates to hold the supporting plate 8 against accidental displacement. A hood or lamp casing 9 embraces the disk 5 and the member 8, and as shown, elongated horizontal slots 10 are formed in the casing through which the retaining devices 11 of the supporting member 8 are extended. Retractile springs 12 are secured at 13 to the disk 5 and at 14, the springs are secured to the supporting member 8 so as to exert their tension to hold the light normally parallel to the longitudinal axis of the frame A of the vehicle.

The headlights shown in Fig. 1 of the drawings each has secured to the casing or hood a bracket arm 15 having a horizontally disposed guide slot 16 therein for a purpose to be hereinafter described. A member 17 is slidable longitudinally on the bracket arm 15, and as illustrated, said member is adapted to be held in its adjusted position on the arm by the set screws 18. A sleeve 19 is pivotally mounted in the member 17 by the bearing screws 20, the said sleeve having therein a leather lined opening 21 for the passage therethrough of the actuating rod 22. Companion adjusting collars 23 and 24 are slidably mounted on the rod 22, the collar 23 being disposed in front of the member 17 and the collar 24 being disposed at the rear of said member. Set screws or other suitable well known fastening devices 25 serve to hold the collars in their adjusted positions on the rod as will be understood.

The steering rod 26 shown in Fig. 1 of the drawings has its end portions pivotally connected at 27 to the arms 28 of the wheel posts 29, and adjacent to said arms, the rod 26 has portions slidably connected with the arms 30 of the bell crank levers 31. These levers have their arms 32 pivoted at 33 to the rear ends of the rods 22 so that on adjustment of the steering rod 26 to the dotted line position the hoods of the headlights will be moved angularly with respect to the longitudinal axis of the vehicle. Each hood carries a reflector 34 so arranged that the light will be positively thrown onto the road in advance of the vehicle regardless of the adjustment of the steering mechanism.

Through the provision of the relatively adjustable collars 23 and 24 means are employed for adjusting the swing of the headlight, it being obvious that when the collar 24 is adjusted so as to lie relatively close to the member 17, the movements of the rod 26 and the headlight will be substantially simultaneous. When the collar is adjusted to lie some distance behind the member 17, the light will only be sensitive to movement on considerable adjustment of the steering rod. From the construction described, means are employed, whereby the lamps may be made to swing rapidly or slowly; or one light can be adjusted to respond instantaneously on movement of the steering gear while the other light can be adjusted to respond to only considerable adjustment of the steering gear.

I claim:

1. A headlight comprising a stationary lamp portion provided with an attaching bracket, a disk carried thereby, a supporting plate revolubly mounted on the stationary lamp portion and arranged above said disk, a lamp casing carried by the plate, a reflector carried by and movable with the casing, retractile springs connecting the disk and plate, an arm extending from the casing, and means connected with said arm for turning the casing against the resistance of said springs.

2. A headlight comprising a fixedly mounted lamp member, a movable reflector thereon, an arm extending from the reflector, a member adjustable longitudinally on the arm, and actuating means operatively connected with the arm-carried-member and including relatively adjustable portions located at opposite sides of the said arm-carried-member.

3. A headlight comprising a base member, a tube thereon, a support revolubly mounted on the tube, elastic means connecting the base member with the support to normally hold the former against movement on the latter, a reflector carried by the support, and means for moving the support against the tension of the elastic means.

4. A headlight comprising a base member, a revolubly mounted reflector thereon, a slotted arm secured to the reflector, and an actuating member extending through the slotted arm and adjustable longitudinally thereon and including relatively adjustable portions disposed at opposite sides of the arm.

5. A headlight including a revolubly mounted reflector, an arm thereon, a member mounted for longitudinal adjustment on the arm, an actuating rod slidable through the adjustable member, and relatively adjustable members on the actuating rod.

6. A headlight including a revolubly mounted reflector, a slotted arm thereon, a member adjustable longitudinally on the arm, a movable member carried by the adjustable member, and an actuating rod extending through the movable member and through the arm and including means for contacting with the arm on movement of the rod to revolve the reflector.

In testimony whereof I affix my signature in presence of two witnesses.

JOSEPH M. HIXON.

Witnesses:
MARK O. SMITH,
L. THOMPSON.

Copies of this patent may be obtained for five cents each, by addressing the "Commissioner of Patents, Washington, D. C."